United States Patent
Ochi (10) Patent No.: US 8,764,426 B2
(45) Date of Patent: Jul. 1, 2014

(54) ELECTROMOTIVE INJECTION MOLDING MACHINE AND POWER SUPPLYING METHOD OF ELECTROMOTIVE INJECTION MOLDING MACHINE

(75) Inventor: Kiyoshi Ochi, Hiroshima (JP)

(73) Assignee: The Japan Steel Works, Ltd., Tokyo (JP)

( * ) Notice: Subject to any disclaimer, the term of this patent is extended or adjusted under 35 U.S.C. 154(b) by 385 days.

(21) Appl. No.: 13/177,049

(22) Filed: Jul. 6, 2011

(65) Prior Publication Data

US 2012/0009297 A1     Jan. 12, 2012

(30) Foreign Application Priority Data

Jul. 6, 2010  (JP) .................. 2010-153562

(51) Int. Cl.
*B29C 45/17*     (2006.01)

(52) U.S. Cl.
USPC ........................... 425/162; 318/806; 318/812

(58) Field of Classification Search
USPC .......... 425/145, 162, 542, 556, 589; 318/805, 318/806, 812
See application file for complete search history.

(56) References Cited

U.S. PATENT DOCUMENTS

| | | | | |
|---|---|---|---|---|
| 4,887,012 A * | 12/1989 | Kiya et al. | ..................... | 318/434 |
| 5,362,222 A * | 11/1994 | Faig et al. | ..................... | 425/145 |
| 6,142,760 A * | 11/2000 | Niizeki et al. | ................ | 425/145 |
| 6,333,611 B1 * | 12/2001 | Shibuya et al. | ............... | 425/145 |
| 6,435,312 B2 * | 8/2002 | Tajima et al. | ................ | 318/801 |
| 6,682,332 B2 * | 1/2004 | Pfahl | ............................. | 425/145 |
| 6,752,614 B2 * | 6/2004 | Mizuno | .......................... | 425/145 |
| 7,227,323 B2 * | 6/2007 | Yamada et al. | ............... | 318/376 |
| 8,235,693 B2 * | 8/2012 | Ochi | ............................. | 425/162 |

FOREIGN PATENT DOCUMENTS

JP      2009-241287 A     10/2009

* cited by examiner

*Primary Examiner* — James Mackey
(74) *Attorney, Agent, or Firm* — Sughrue Mion, PLLC (57) ABSTRACT

A power supplying apparatus for supplying power to servo amplifiers is configured by an AC/DC converter and a predetermined power storage circuit. In a process of a molding cycle except for an injection process, power is supplied from the AC/DC converter, and the power is stored in the power storage circuit. In the injection process, the AC/DC converter and the power storage circuit are controlled in conjunction with each other to supply the stored power, which is required when performing the injection process, from the power storage circuit, so as to prevent the AC/DC converter from supplying an excessive amount of power.

6 Claims, 8 Drawing Sheets

ELECTROMOTIVE INJECTION MOLDING MACHINE AND POWER SUPPLYING METHOD OF ELECTROMOTIVE INJECTION MOLDING MACHINE

This application claims priority from Japanese Patent Application No. 2010-153562 filed on Jul. 6, 2010, the entire subject-matter of which is incorporated herein by reference.

BACKGROUND OF THE INVENTION

1. Field of the Invention

The present invention relates to an electromotive injection molding machine and a power supplying method of controlling a power supplying apparatus of the electromotive injection molding machine to supply power to servo motors that is mounted to a screw, a mold opening/shutting device, a molded product ejecting device, and the like, of the injection molding machine.

2. Description of the Related Art

An injection molding machine includes a pair of molds, a mold clamping device that mold-clamps the molds, an injection device that melts and injects resin into the molds, and the like. The injection device includes an injection cylinder, a screw that is driven in a rotating direction and an axial direction in the injection cylinder, a plunger and the like. In an electromotive type injection molding machine, the mold clamping device, the screw and the like are driven by servo motors that are independently mounted, respectively. During a molding cycle in the injection molding machine, an injection process requires higher power, even though a process time for the injection process is short, compared to the other processes. Accordingly, a large-scaled and high power servo motor is adopted for the servo motor that drives the screw in the axial direction in the injection process, so-called servo motor for an injection axis. In recent years, an ultra high-speed injection molding is highly needed which has excellent transcription and thus can mold a product having a complicated and fine shape or thin product with good transcription. In the injection molding machine capable of implementing the ultra high-speed injection molding, the injection process requires the further higher power, so that a servo motor having a larger size is adopted.

In the injection molding machine, a converter is mounted in which three-phase alternating-current (AC) voltage, which is supplied from a power receiving equipment of a factory, is converted into direct-current (DC) voltage, i.e., is rectified. The rectified DC voltage is supplied to an inverter circuit, which is equipped in relation with each servo motor, i.e., to a servo amplifier through a DC circuit. Accordingly, when the DC voltage is converted into a three-phase AC voltage of predetermined current with a predetermined frequency in the servo amplifier, the servo motor can be driven. When the servo motor for an injection axis is driven with high power, the servo amplifier is required to supply the high power to the servo motor. Hence, the high current is required with respect to current of the DC voltage to be supplied to the servo amplifier. Thus, the three-phase AC power source supplied from the power receiving equipment of a factory also requires the high current supply capability, considering the injection process in which the high output driving is required, so that the relatively high power capacity is required. Since the electric power rate structure is different depending on the contracted maximum power, the electricity rate is increased when the power receiving equipment having the high power capacity is equipped. Accordingly, a technology is needed which can reduce the power capacity required for the power receiving equipment, considering the necessities of energy saving and cost reduction, and thus decreasing the consumed electricity rate.

In JP-A-2009-241287, the inventor suggested a power supplying apparatus of an electromotive injection molding machine that stores power in a process of respective processes of a molding cycle, in which power is less consumed, supplies the stored power in a process that requires high power such as injection process, smoothes the powers required in the respective processes of the molding cycle and can reduce the maximum power to be supplied from the outside. The power supplying apparatus of JP-A-2009-241287 includes an alternating-current/direct-current (AC/DC) converter and a power storage device. The AC/DC converter is configured by a diode rectification circuit, a PWM converter, and the like. An input side of the AC/DC converter is connected to a three-phase AC power source, and an output side thereof is connected to a DC voltage line, i.e., DC circuit. The AC/DC converter rectifies the three-phase AC voltage supplied from the power receiving equipment of a factory into the DC voltage and supplies the DC voltage to the servo amplifiers provided to the respective servo motors. The power storage device is provided with a predetermined power storage circuit and is connected to the DC circuit of the output side of the AC/DC converter. By appropriately controlling the power storage circuit, it is possible to receive the power supplied from the DC circuit, to store the received power in the circuit, and to supply the stored power to the DC circuit, as required. Accordingly, by storing the power in the power storage circuit in the process of the respective processes of the molding cycle, in which power is less consumed, and by supplying the stored power in the process that requires the high output, it is possible to smooth the powers required in the respective processes of the molding cycle, so that it is possible to reduce the maximum power to be supplied from the outside. Therefore, the power capacity required for the power receiving equipment of the factory is also decreased, so that it is possible to reduce not only the equipment cost but also the required electricity rate.

The power supplying apparatus disclosed in JP-A-2009-241287 can store the power and supply the stored power, as required. Therefore, it is possible to smooth the power required in the respective processes of the molding cycle in the injection molding machine and to reduce the maximum power to be supplied from the three-phase AC power source. However, the power supplying apparatus disclosed in JP-A-2009-241287 seems to have problems to be solved. That is, JP-A-2009-241287 does not disclose a method of optimally controlling the power supplying apparatus. More specifically, JP-A-2009-241287 discloses a method of solely controlling the power storage circuit itself and a method of storing or supplying the power. However, JP-A-2009-241287 does not disclose a method of controlling the power storage circuit in conjunction with the control on the DC/AC converter or servo amplifiers. The power storage circuit, the DC/AC converter and the servo amplifier are connected to each other by the DC circuit. Accordingly, if they are independently controlled each other, a change in the DC voltage due to the other control causes disturbance, so that it becomes difficult to perform the appropriate control. In addition, even when the power storage circuit, the DC/AC converter and the servo amplifier are controlled in conjunction with each other, a specific control method thereof is unclear. Hence, there is no guarantee that can securely cope with the high power, which is instantaneously required when performing the injection process, for example. That is, there is no guarantee that can sufficiently reduce the maximum power.

SUMMARY OF THE INVENTION

An object of the invention is to provide a power supplying method of an electromotive injection molding machine having solved the above problems. Specifically, an object of the invention is to provide a power supplying method of an electromotive injection molding machine, which controls a power storage circuit provided to a power supplying apparatus of the electromotive injection molding machine in conjunction with an alternating-current/direct-current converter or servo amplifiers, so as to smoothen power, which is required in a whole molding cycle, and to securely reduce maximum power to be supplied from the outside.

In order to achieve the above object, the invention is configured to control a power supplying apparatus including a predetermined power storage circuit by a predetermined control method in order to supply power to servo amplifiers of an electromotive injection molding machine. The power supplying apparatus includes an alternating-current/direct-current (AC/DC) converter, which includes a PWM converter or diode rectification circuit and converts a three-phase alternating-current (AC) voltage to supply a DC voltage to a DC circuit, and a power storage circuit that is connected to the DC circuit. The DC voltage is supplied to servo amplifiers from the DC circuit. The power storage circuit may have two different configurations.

The power storage circuit may be configured by a first power storage circuit having a following configuration.

The first power storage circuit includes at least first and second loop circuits.

The first loop circuit is a circuit in which a positive terminal connected to a DC circuit, a negative terminal, a coil, a first switch circuit and a capacitor are connected in series.

The second loop circuit is a circuit in which the positive terminal, the negative terminal, the coil and a second switch circuit are connected in series.

The first switch circuit includes a first diode and a first transistor, which are connected in parallel with each other, the first diode is provided to supply current in a direction from the positive terminal to the negative terminal and the first transistor is provided to supply current in a direction from the negative terminal to the positive terminal when the first transistor is turned to be ON.

The second switch circuit includes a second diode and a second transistor, which are connected in parallel with each other, the second diode is provided to supply current in a direction from the negative terminal to the positive terminal and the second transistor is provided to supply current in a direction from the positive terminal to the negative terminal when the second transistor is turned to be ON.

When controlling ON/OFF of the second transistor (ON means conducting current, and OFF means opening a circuit), current is supplied from the positive and negative terminals to the first power storage circuit, so that the first power storage circuit can store charges in the capacitor. That is, it is possible to store the power in the first power storage circuit. In addition, when controlling ON/OFF of the first transistor, it is possible to supply the power stored in the first power storage circuit to the DC circuit.

The power storage circuit may be configured by a second power storage circuit having a following configuration, instead of the first power storage circuit.

The second power storage circuit includes at least third and fourth loop circuits.

The third loop circuit is a circuit in which a capacitor, a coil, a third switch circuit, a positive terminal connected to the DC circuit and a negative terminal are connected in series.

The fourth loop circuit is a circuit in which a fourth switch circuit, the third switch circuit, the positive terminal and the negative terminal are connected in series.

The third switch circuit includes a third diode and a third transistor, which are connected in parallel with each other, the third diode is provided to supply current in a direction from the negative terminal to the positive terminal and the third transistor is provided to supply current in a direction from the positive terminal to the negative terminal when the third transistor is turned to be ON.

The fourth switch circuit includes a fourth diode and a fourth transistor, which are connected in parallel with each other, the fourth diode is provided to supply current in a direction from the negative terminal to the positive terminal and the fourth transistor is provided to supply current in a direction from the positive terminal to the negative terminal when the fourth transistor is turned to be ON.

When controlling ON/OFF of the third transistor, current is supplied from the positive and negative terminals to the second power storage circuit, so that the second power storage circuit can store charges in the capacitor. That is, it is possible to store power in the second power storage circuit. In addition, when controlling ON/OFF of the fourth transistor, it is possible to supply the power stored in the second power storage circuit to the DC circuit.

In the invention, the power supplying apparatus having one of the first and second power storage circuits is controlled by selecting one of following three different control methods so as to supply power.

When adopting a first control method, it is necessary to configure the AC/DC converter with a controllable PWM converter. The first control method is configured as follows.

In a process of a molding cycle except for an injection process, the ON/OFF of the second transistor of the first power storage circuit is controlled to store predetermined charges in the capacitor and to store power in the power storage circuit. When the power storage circuit is the second power storage circuit, the ON/OFF of the third transistor, not the second transistor, is controlled.

The AC/DC converter is controlled in the injection process such that a temporary target current, which is a temporary target value for direct current of the AC/DC converter, is obtained from a difference voltage between a target voltage of a DC voltage and an actually measured voltage, and a high frequency component exceeding a frequency having a predetermined threshold is removed from the temporary target current to obtain a target current, so as to control a direct current supplied from the AC/DC converter to become the target current.

In the injection process, when supplying the power stored in the power storage circuit to the DC circuit by controlling the ON/OFF of the first transistor of the first power storage circuit, a target coil current for controlling current flowing through a coil is the high frequency component of the temporary target current. When the power storage circuit is the second power storage circuit, the ON/OFF of the fourth transistor, not the first transistor, is controlled.

The second control method is configured as follows.

In a process of a molding cycle except for an injection process, the ON/OFF of the second transistor of the first power storage circuit is controlled to store predetermined charges in the capacitor and to store power in the power storage circuit. When the power storage circuit is the second power storage circuit, the ON/OFF of the third transistor, not the second transistor, is controlled.

In the injection process, when supplying the power stored in the power storage circuit to the DC circuit by controlling the ON/OFF of the first transistor of the first power storage circuit, a target coil current for a coil is obtained from information of driving power of an injection servo motor, and a coil current of the coil is controlled on the basis of the target coil current. When the power storage circuit is the second power storage circuit, the ON/OFF of the fourth transistor, not the first transistor, is controlled. Here, when supplying the same power as the driving power of the servo motor from the power storage circuit, a magnitude of the target coil current corresponds to that of a current to be supplied from the power storage circuit.

The third control method is configured as follows.

In a process of a molding cycle except for an injection process, the ON/OFF of the second transistor of the first power storage circuit is controlled to store predetermined charges in the capacitor and to store power in the power storage circuit. When the power storage circuit is the second power storage circuit, the ON/OFF of the third transistor, not the second transistor, is controlled.

In the injection process, when supplying the power stored in the power storage circuit to the DC circuit by controlling the ON/OFF of the first transistor of the first power storage circuit, a temporary target current, which is a temporary target value for current to be supplied from the AC/DC converter, is obtained from a difference voltage between a target voltage of a DC voltage and an actually measured voltage, and a target coil current for a coil is obtained by adding current calculated on the basis of driving power of an injection servo motor to the temporary target current, so that a coil current of the coil is controlled on the basis of the target coil current. When the power storage circuit is the second power storage circuit, the ON/OFF of the fourth transistor, not the first transistor, is controlled. Here, when supplying the same power as the driving power of the servo motor from the power storage circuit, a magnitude of the current calculated on the basis of the driving power of the injection servo motor corresponds to that of a current to be supplied from the power storage circuit.

Incidentally, the above-described three different control methods may be performed by a controller provided in the electromotive injection molding machine.

According to a first aspect of the invention in which the first control method is adopted, since the power supplying apparatus includes one of the first and second power storage circuits and the power supplying apparatus having the power storage circuit is controlled by the first control method, it is possible to control the AC/DC converter and the power storage circuit, which configure the power supplying apparatus, in conjunction with each other. Specifically, when controlling the AC/DC converter, the power supplying apparatus obtains the temporary target current, which is a temporary target value for direct current of the AC/DC converter, from the difference voltage between the target voltage of the DC voltage and the actually measured voltage. Then, the power supplying apparatus removes a high frequency component exceeding a frequency having a predetermined threshold from the temporary target current and controls the temporary target current, from which the high frequency component has been removed, as the target current. In addition, when controlling the power storage circuit in the injection process, the power supplying apparatus is configured to control the current of the coil in the power storage circuit while regarding the removed high frequency component as the target coil current. When performing the injection process, since a large amount of power is instantaneously required, the DC voltage of the DC circuit is varied with a short period. Accordingly, the DC voltage is varied with high frequencies. In other words, the direct current that is necessary when performing the injection process appears in the high frequency component, with respect to the temporary target current obtained from the difference voltage between the target voltage of the DC voltage and the actually measured voltage. According thereto, it is possible to supply the direct current, which is necessary when performing the injection process requiring the maximum power, from the power storage circuit and to supply the other direct current from the AC/DC converter. Therefore, it is possible to securely reduce the maximum power to be supplied from the outside.

According to a second aspect of the invention in which the second control method is adopted, since the power supplying apparatus includes one of the first and second power storage circuits and the power supplying apparatus having the power storage circuit is controlled by the second control method, it is possible to control the power storage circuit and the servo amplifier, which is provided to the injection servo motor, in conjunction with each other. Specifically, the power supplying apparatus is configured to obtain the target coil current from the information of the driving power of the injection servo motor and to control the power storage circuit so that a coil current of the coil in the power storage circuit becomes the target coil current. Accordingly, it is possible to directly supply the direct current, which is required by the servo amplifier when performing the injection process, from the power storage circuit. In other words, by controlling the servo amplifier of the injection servo motor and the power storage circuit in conjunction with each other, it is possible to supply the power that is required by the injection servo motor from the power storage circuit, so that it is possible to securely reduce the maximum power.

According to a third aspect of the invention in which the third control method is adopted, since the power supplying apparatus includes one of the first and second power storage circuits and the power supplying apparatus having the power storage circuit is controlled by the third control method, it is possible to control the power storage circuit and the servo amplifier, which is provided to the injection servo motor, in conjunction with each other. Specifically, the power supplying apparatus obtains the temporary target current, which is a temporary target value for current supplied by the AC/DC converter, from the difference voltage between the target voltage of the DC voltage and the actually measured voltage and obtains a target coil current of a coil in the power storage circuit by adding current calculated on the basis of the driving power of the injection servo motor to the temporary target current. Then, when controlling the power storage circuit, a coil current of the coil is controlled to become the target coil current. Accordingly, it is possible to directly supply the direct current that is required by the injection servo motor when performing the injection process from the power storage circuit and to make the DC voltage be a target voltage. According thereto, it is possible to supply the power that is required by the injection servo motor from the power storage circuit and to control so that the DC voltage becomes a target voltage. Therefore, it is possible to securely reduce the maximum power and to stabilize the direct-current voltage.

BRIEF DESCRIPTION OF THE DRAWINGS

FIGS. 3A to 3D are views that pictorially show operations of the power storage circuit according to the first illustrative embodiment, in which FIGS. 3A and 3B show operating states of the circuit when storing power in the power storage circuit, and FIGS. 3C and 3D show operating states of the circuit when outputting the power to an outside from the power storage circuit;

DETAILED DESCRIPTION OF THE PREFERRED EMBODIMENTS

Figure 1:
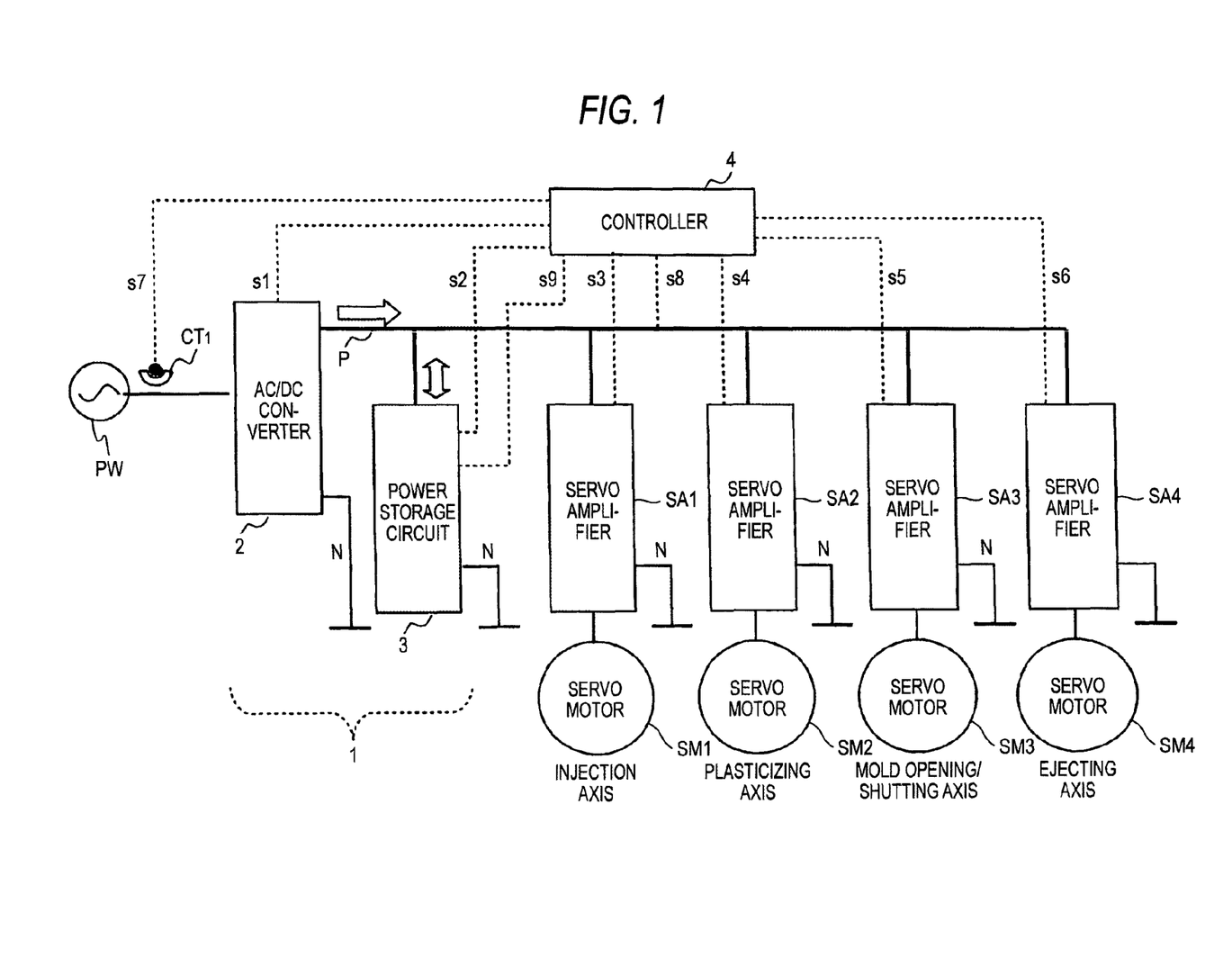
FIG. 1 is a wiring diagram that pictorially illustrates a connection state of a power supplying apparatus and respective servo amplifiers of an injection molding machine according to an illustrative embodiment of the invention.

Hereinafter, illustrative embodiments of the invention will be described. A power supplying apparatus of an electromotive injection molding machine according to the illustrative embodiment rectifies three-phase alternating current to supply a direct-current voltage to servo amplifiers. That is, as shown in FIG. 1, a power supplying apparatus 1 according to the illustrative embodiment is connected to a three-phase alternating-current (AC) power source PW, and a positive voltage line P, which is a direct-current (DC) circuit side, is connected to servo amplifiers SA1, SA2, . . . . Since both of the power supplying apparatus 1 and the servo amplifiers SA1, SA2, . . . are connected to a negative voltage line N, it is possible to supply a DC voltage from the power supplying apparatus 1 to the servo amplifiers SA1, SA2, . . . through the positive voltage line P. Accordingly, the servo amplifiers SA1, SA2, . . . can drive servo motors SM1, SM2, . . . , which are provided in correspondence to an injection axis that drives a screw in an axial direction, a plasticizing axis that drives a screw in a rotating direction, a mold opening/shutting axis and an ejecting axis that drives an ejector pin. The power supplying apparatus 1 according to the illustrative embodiment includes an alternating-current/direct-current (AC/DC) converter 2 that converts a three-phase AC voltage into a DC voltage and a power storage circuit 3. The AC/DC converter 2 is a converter that converts a three-phase AC voltage into a DC voltage. The AC/DC converter 2 can be configured by a diode rectification circuit, PWM converter, and the like. Although the diode rectification circuit cannot perform a special control, the PWM converter can perform a control of improving a power factor or returning regenerative power and can also control the current. Thus, in the illustrative embodiment, the AC/DC converter 2 is configured by the PWM converter that can perform the various controls. As described later, the power storage circuit 3 is adapted to store a part of the power supplied from the AC/DC converter 2 and to control the stored power into a predetermined voltage when receiving an output request so as to supply the stored power to the positive voltage line P.

The electromotive injection molding machine includes a controller 4 that is connected to the AC/DC converter 2, the power storage circuit 3 and the servo amplifiers SA1, SA2, . . . by signal lines s1, s2, . . . , respectively. Accordingly, the controller 4 can control the AC/DC converter 2, the power storage circuit 3 and the servo amplifiers SA1, SA2, . . . . In addition, a current detector CT1 that is provided in relation with the AC/DC converter 2 and the positive and negative voltage lines P, N are also connected to the controller 4 by the signal lines s7, s8, so that the current flowing through the AC/DC converter 2 and voltage of the DC circuit is input to the controller 4. The power storage circuit 3 (which will be described later) includes therein a current detector and a voltage detector, which are connected to the controller 4 by the signal line s9, so that the current and voltage are input to the controller 4.

The power storage circuit 3 can adopt a variety of illustrative embodiments and can be classified into one of first and second configurations. Hereinafter, a power storage circuit 3a according to a first illustrative embodiment, which belongs to the first configuration, will be described.

Figure 2:
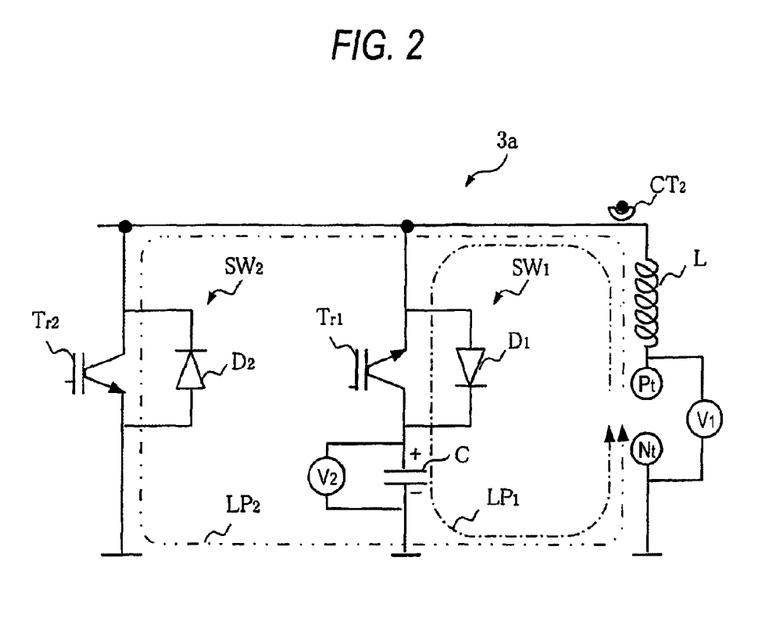
FIG. 2 is a circuit diagram that shows a power storage circuit according to a first illustrative embodiment of the invention.

As shown in FIG. 2, the power storage circuit 3a includes a positive terminal $P_t$ that is connected to the positive voltage line P of the DC circuit, a negative terminal $N_t$ that is connected to the negative voltage line N, one capacitor C, one coil L and first and second switch circuits $SW_1$, $SW_2$. The first switch circuit $SW_1$ includes a first transistor $Tr_1$ and a first diode $D_1$, and the second switch circuit $SW_2$ includes a second transistor $Tr_2$ and a second diode $D_2$. As the capacitor C, an electrical double layer capacitor is adopted, for example. As the transistors $Tr_1$, $Tr_2$, an insulated gate bipolar transistor, i.e., IGBT is adopted, for example. Specifically describing the wiring state of the power storage circuit 3a, the power storage circuit 3a includes first and second loop circuits $LP_1$, $LP_2$. The negative terminal $N_t$, the positive terminal $P_t$ and the coil L are connected in series and are commonly shared by the first and second loop circuits $LP_1$, $LP_2$. The first switch circuit $SW_1$ and the capacitor C are connected in series to the first loop circuit $LP_1$, and the second switch circuit $SW_2$ is connected to the second loop circuit $LP_2$. Accordingly, looking at the first loop circuit $LP_1$, the negative terminal $N_t$, the positive terminal $P_t$, the coil L, the first switch circuit $SW_1$ and the capacitor C are connected in series. Further, looking at the second loop circuit $LP_2$, the negative terminal $N_t$, the positive terminal $P_t$, the coil L, the second switch circuit $SW_2$ are connected in series. Each of the first and second switch circuits $SW_1$, $SW_2$ is a circuit in which one diode and one transistor are connected in parallel with each other. Each of the first and second switch circuits $SW_1$, $SW_2$ controls the current flow such that the current is freely supplied in one direction and is supplied in a reverse direction only when the transistor is turned to be ON, i.e., only when each of the first and second switch circuits $SW_1$, $SW_2$ is switched. Specifically, in the first switch circuit $SW_1$, the first diode $D_1$ is connected to supply the current in a direction from the positive terminal $P_t$ to the negative terminal $N_t$ and the first transistor $Tr_1$ is connected in parallel with the first diode $D_1$ so that the transistor supplies the current in a reverse direction when it is turned to be ON. In the second switch circuit $SW_2$, the second diode $D_2$ is connected to supply the current in a direction from the negative terminal $N_t$ to the positive terminal $P_t$ and the second transistor $Tr_2$ is connected in parallel with the second diode $D_2$ so that the transistor supplies the current in a reverse direction when it is turned to be ON.

A current detector CT2 is provided adjacent to the coil L so as to measure the coil current flowing through the coil L. Further, a voltage detector V1 is provided between the positive and negative terminals $P_t$, $N_t$, and a voltage detector V2 is provided between both ends of the capacitor C, so as to measure a DC voltage and a capacitor voltage. The voltage and current are input to the controller 4 by the signal line s9. In FIG. 1, the power storage circuit 3 is connected to the controller 4 by one signal line s2, so that the power storage circuit 3 is controlled. However, two signal lines of controlling the first and second transistors $Tr_1$, $Tr_2$ are actually connected. The signal lines and the first and second transistors $Tr_1$, $Tr_2$ are connected with being electrically insulated through photo couplers and the like, so that voltages having different potentials are not input to the controller 4. However, the photo couplers and the like are not shown in FIG. 2.

Figure 3A:
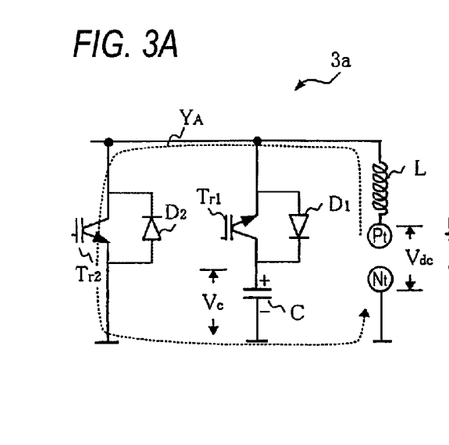
Figure 3B:
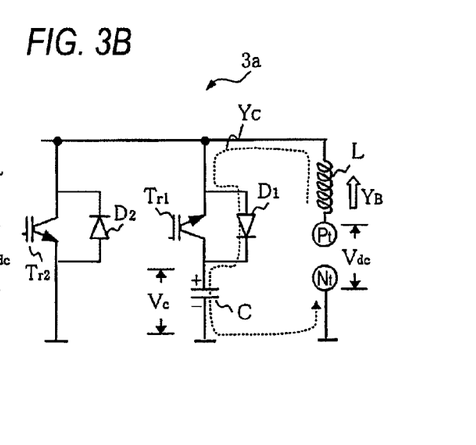

Operations of the power storage circuit 3a will be described with reference to FIGS. 3A to 3D. In an initial state, since the power storage circuit 3a is configured so that the first diode $D_1$ freely supplies the current in the direction from the positive terminal $P_t$ to the capacitor C, a potential of the positive (+) electrode side of the capacitor C is the same as that of the positive terminal $P_t$. Accordingly, a storage voltage $V_c$, which is a voltage of the capacitor C, is the same as a voltage $V_{dc}$ of the DC circuit side, i.e., a voltage $V_{dc}$ between the positive and negative terminals $P_t$, $N_t$. A case where the power is stored from the above state is described. The second transistor $Tr_2$ is switched, i.e., turned to be ON, as shown in FIG. 3A. By doing so, the current that is supplied from the positive and negative terminals $P_t$, $N_t$ of the direct-current circuit is supplied in an arrow direction YA. When predetermined time elapses after the current is supplied, magnetic energy is accumulated in the coil L. Then, the second transistor $Tr_2$ is turned to be OFF. By doing so, as shown in FIG. 3B, electromotive force of a high voltage in an arrow direction YB is instantaneously generated in the coil L by the magnetic energy accumulated in the coil L. By the generated electromotive force, the current is supplied via the diode $D_1$, as shown with an arrow YC, so that the charges are stored in the capacitor C. In other words, the voltage is boosted by the operation of the coil L, so that the charges are accumulated in the capacitor C. When the ON/OFF operations of the second transistor $Tr_2$ are repeated, the charges are sufficiently stored in the capacitor C and the storage voltage $V_c$ becomes higher than the voltage $V_{dc}$ between the terminals. That is, the power is stored in the power storage circuit 3a.

Figure 3C:
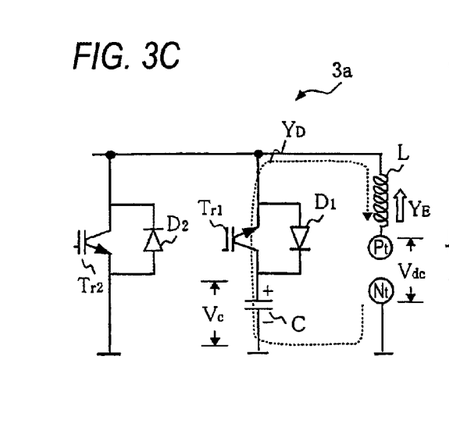
Figure 3D:
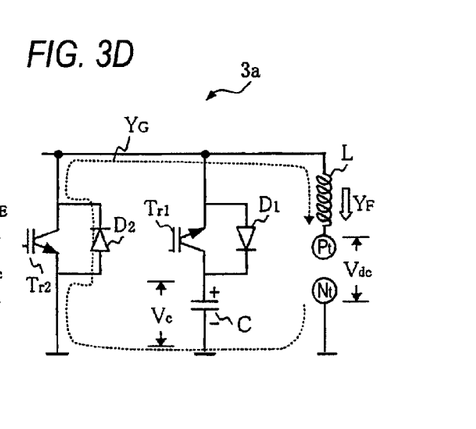

A case where the power is output from the power storage circuit 3a to the DC circuit side is described. By the above operation described in the preceding paragraph, a following relation between the storage voltage $V_c$ and the voltage $V_{dc}$ between the terminals is satisfied.

$$V_c > V_{dc}$$

Therefore, when the first transistor $Tr_1$ is turned to be ON, the current is supplied in an arrow direction TD, as shown in FIG. 3C. When the current is supplied, the magnetic energy is accumulated in the coil L, and electromotive force is generated in the coil L in an arrow direction YE. In other words, the electromotive force of the coil L shares the potential difference between the storage voltage $V_c$ and the voltage $V_{dc}$ between the terminals. Then, the first transistor $Tr_1$ is turned to be OFF. By doing so, as shown in FIG. 3D, electromotive force of a high voltage in the arrow direction YE is generated in the coil L so as to keep the current of coil L by the magnetic energy accumulated in the coil L, and the current is supplied via the second diode $D_2$ in an arrow direction YG by the electromotive force generated in the coil L. Accordingly, by repeating the ON/OFF operations of the first transistor $Tr_1$, it is possible to continuously supply the current from the power storage circuit 3a to the DC circuit.

The power supplying apparatus 1 according to the illustrative embodiment is controlled by one of the first to third different control methods, so as to supply the DC power to the servo amplifiers. The first to third control methods have the characteristics in the power supplying method in the injection process, and the power supplying method in the other processes of the injection molding cycle can be implemented by an arbitrary method. For example, in the processes except for the injection process, the AC/DC converter 2 configured by the PWM converter may be controlled by the PID method or other control method so as to make the DC voltage of the DC circuit side constant. However, the power is stored in the power storage circuit 3a at that time. In other words, in the processes of the injection molding cycle except for the injection process, the second transistor $Tr_2$ of the power storage circuit 3a is turned to be ON/OFF, so as to store the power in the power storage circuit 3a. That is, since the other processes except for the injection process use less power, it is possible to store the power without applying the load to the three-phase AC power source PW. In the following, the control methods implemented in the injection process will be described. First, the first control method will be described with reference to FIG. 4.

Figure 4:
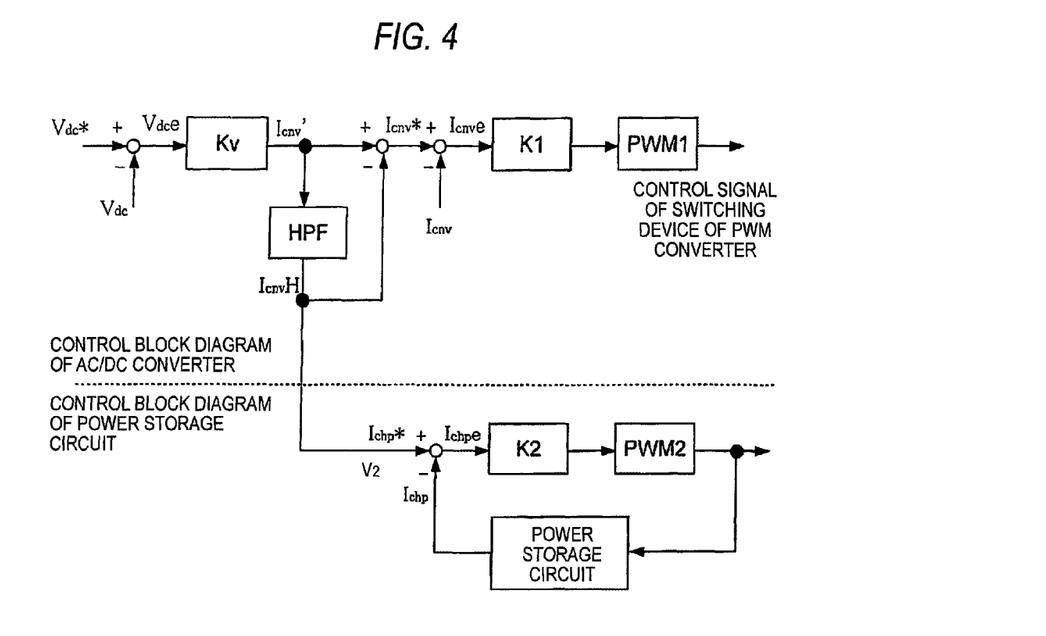
FIG. 4 is a block diagram showing a first control method of the power supplying apparatus according to the illustrative embodiment.

The first control method is a method of controlling the AC/DC converter 3 and the power storage circuit 3a in conjunction with each other when performing the injection process. In the controller 4, a difference voltage $V_{dc}e$ is obtained from a target voltage $V_{dc}^*$ of the DC circuit and an actually measured voltage $V_{dc}$.

$$V_{dc}e = V_{dc}^* - V_{dc}$$

The difference voltage $V_{dc}e$ is amplified in a voltage controller Kv by a predetermined gain, which is then set as a temporary target value of the current to be supplied from the AC/DC converter 2, i.e., a temporary target current $I_{cnv}'$. Then, the temporary target current $I_{cnv}'$ is enabled to pass through a high-pass filter HPF to obtain a high frequency component $I_{cnv}H$ exceeding a frequency having a predetermined threshold. The high frequency component is removed from the temporary target current $I_{cnv}'$, so that a target value of the current in the AC/DC converter 2, i.e., a target current $I_{cnv}^*$ is obtained.

$$I_{cnv}^* = I_{cnv}' - I_{cnv}H$$

Alternatively, even when the temporary target current $I_{cnv}'$ is enabled to pass through a low-pass filter to remove a high frequency component exceeding a frequency having a predetermined threshold, a target current $I_{cnv}^*$ can be obtained.

After that, the controller 4 controls the AC/DC converter 2, based on the target current $I_{cnv}^*$. Specifically, a difference current Icnve is obtained from the target current $I_{cnv}^*$ of the AC/DC converter 2 and an actually measured current target current $I_{cnv}$.

$$Icnve = I_{cnv}^* - I_{cnv}$$

The difference current Icnve is amplified in a current controller K1, and a control signal of a pulse shape, i.e., a converter DRV signal is obtained by a pulse width modulator PWM1. By the converter DRV signal, the AC/DC converter 2 configured by the PWM converter is controlled. By doing so, the current that is supplied from the AC/DC converter 2 is controlled to become the target current $I_{cnv}*$.

In the first control method, the power storage circuit 3a is controlled as follows.

The high frequency component $I_{cnv}H$ of the temporary target current $I_{cnv}'$ in the AC/DC converter 2, which is obtained by the high-pass filter HPF and exceeds the frequency having a predetermined threshold, is set as a target current $I_{chp}*$ of the current $I_{chp}$ that is supplied from the power storage circuit 3a to the DC circuit. Actually, since the current $I_{chp}$ that is supplied from the power storage circuit 3a to the DC circuit is the same as the coil current of the coil L, the target current $I_{chp}*$ is referred to as a target coil current $I_{chp}*$. After that, the controller 4 controls the power storage circuit 3a, based on the target coil current $I_{chp}*$. Specifically, a difference coil current $I_{chp}e$ is obtained from the target coil current $I_{chp}*$ of the coil L and the actually measured coil current target coil current $I_{chp}$.

$$I_{chp}e = I_{chp}* - I_{chp}$$

The difference coil current $I_{chp}e$ is amplified in a current controller K2, and a control signal of a pulse shape is obtained by a pulse width modulator PWM2. By the control signal, the first transistor $Tr_1$ of the power storage circuit 3a is turned to be ON/OFF. By doing so, the coil current $I_{chp}$ is controlled to become the target coil current $I_{chp}*$.

When performing the injection process, the voltage of the DC circuit is instantaneously varied. Accordingly, the temporary target current $I_{cnv}'$ is varied with a high period. When extracting the high frequency component of the temporary target current $I_{cnv}'$, it is possible to obtain a change in power that is instantaneously consumed, i.e., a change in current. Accordingly, when the AC/DC converter 2 and the power storage circuit 3a are controlled by the first control method, the power that is instantaneously required when performing the injection process is supplied from the power storage circuit 3a, and the power at the other timings is supplied from the AC/DC converter 2. By doing so, it is possible to suppress the maximum power that is supplied from the three-phase AC power source PW.

Figure 5:
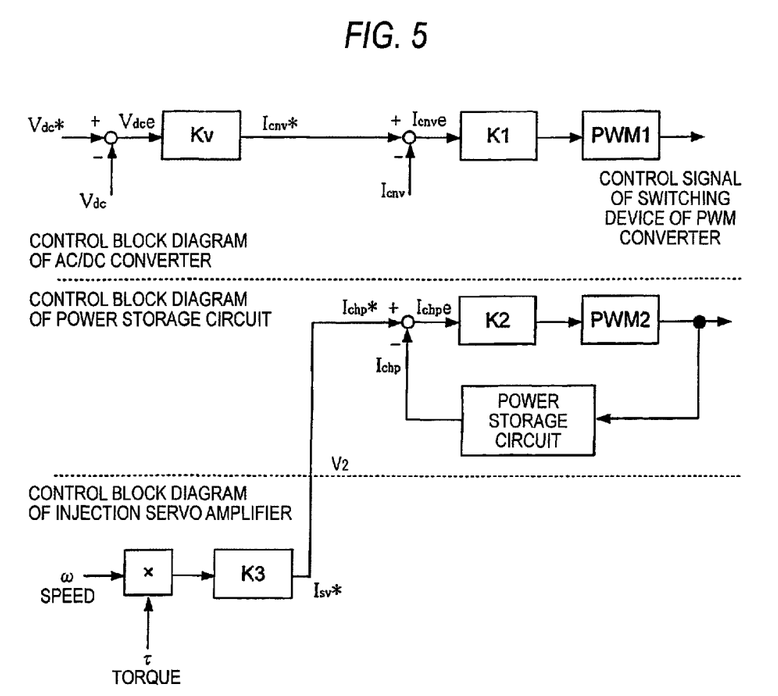
FIG. 5 is a block diagram showing a second control method of the power supplying apparatus according to the illustrative embodiment.

In the following, the second control method will be described with reference to FIG. 5. The second control method is a method of controlling the servo amplifier, which is provided to the injection servo motor for axially driving the screw, and the power storage circuit 3a in conjunction with each other, and the AC/DC converter 2 is independently controlled. Thus, the AC/DC converter 2 can be configured by the diode rectification circuit, not the PWM converter, so that it may not be controlled. However, in this illustrative embodiment, the AC/DC converter 2 is controlled as follows so as to keep the DC voltage constant.

In the controller 4, a difference voltage $V_{dc}e$ is obtained from a target voltage $V_{dc}*$ of the DC circuit and an actually measured voltage $V_{dc}$.

$$V_{dc}e = V_{dc}* - V_{dc}$$

The difference voltage $V_{dc}e$ is amplified in the voltage controller Kv by a predetermined gain, so that a target current $I_{cnv}*$ is obtained. Then, a difference current Icnve is obtained from the target current $I_{cnv}*$ and the actually measured current target current $I_{cnv}$.

$$Icnve = I_{cnv}* - I_{cnv}$$

The difference current Icnve is amplified in the current controller K1, and a control signal of a pulse shape, i.e., a converter DRV signal is obtained by the pulse width modulator PWM1. By the converter DRV signal, the AC/DC converter 2 configured by the PWM converter is controlled. In the control of the AC/DC converter 2, a conformance to the target voltage $V_{dc}*$ is adjusted to be relatively smooth. Accordingly, the AC/DC converter 2 is smoothly controlled with respect to the variation of the actually measured voltage $V_{dc}$, so that the DC voltage of the DC circuit side is kept to be substantially constant.

In the second control method, the controller 4 controls the power storage circuit 3a in conjunction with the control of the servo amplifier of the injection servo motor. The controller 4 multiplies rotating speed co and torque r, which are required for the injection servo motor, and amplifies a result of the multiplication by an amplifier K3 to obtain a target current $I_{sv}*$ that is supplied to the servo amplifier, so as to control the servo amplifier based on the target current $I_{sv}*$. The controller 4 sets the target current $I_{sv}*$ of the servo amplifier as a target value of current to be supplied to the DC circuit from the power storage circuit 3a, i.e., target coil current $I_{chp}*$. The controller 4 controls the power storage circuit 3a based on the target coil current $I_{chp}*$. Specifically, a difference coil current $I_{chp}e$ is obtained from the target coil current $I_{chp}*$ and the actually measured coil current $I_{chp}$.

$$I_{chp}e = I_{chp}* - I_{chp}$$

The difference coil current $I_{chp}e$ is amplified in the current controller K2, and a control signal of a pulse shape is obtained by the pulse width modulator PWM2. By the control signal, the first transistor $Tr_1$ of the power storage circuit 3a is turned to be ON/OFF. By doing so, the coil current $I_{chp}$ is controlled to be the target coil current $I_{chp}*$.

According to the second control method, the power storage circuit 3a is directly controlled based on the power that is supplied to the injection servo motor by the injection servo amplifier. Therefore, it is possible to securely supply the power, which is required when performing the injection process, from the power storage circuit 3a. Incidentally, since the AC/DC converter 2 is smoothly controlled so that the DC voltage is constant, the control of the AC/DC converter 2 can function as a regulator.

Figure 6:
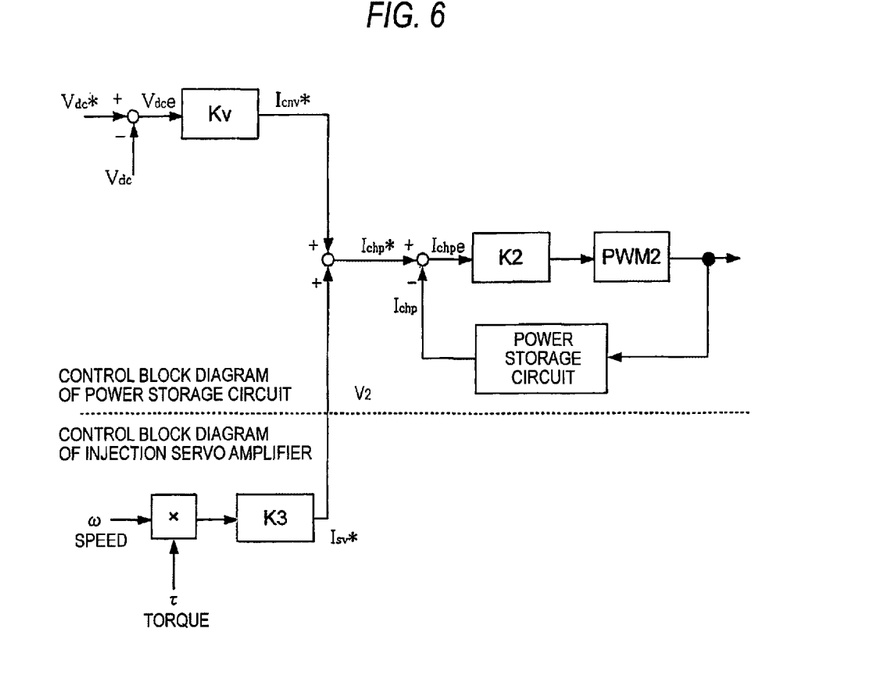
FIG. 6 is a block diagram showing a third control method of the power supplying apparatus according to the illustrative embodiment.

In the following, the third control method will be described with reference to FIG. 6.

The controller 4 multiplies rotating speed co and torque r, which are required for the injection servo motor, and amplifies a result of the multiplication by an amplifier K3 to obtain a target current $I_{sv}*$ that is supplied to the servo amplifier, so as to control the servo amplifier based on the target current $I_{sv}*$.

Further, the controller 4 obtains a difference voltage $V_{dc}e$ from a target voltage $V_{dc}*$ of the DC circuit and an actually measured voltage $V_{dc}$.

$$V_{dc}e = V_{dc}* - V_{dc}$$

The difference voltage $V_{dc}e$ is amplified in the voltage controller Kv by a predetermined gain, so that a target value of the current to be supplied from the AC/DC converter 2, i.e., a target current $I_{cnv}*$ is obtained.

The controller 4 adds the target current $I_{sv}*$ of the servo amplifier and the target current $I_{cnv}*$ of the AC/DC converter 2 and sets a result of the addition as a target value of the current to be supplied to the DC circuit from the power storage circuit 3a, i.e., target coil current $I_{chp}*$. Then, the controller 4 controls the power storage circuit 3a based on the target coil current $I_{chp}*$. Specifically, a difference coil current $I_{chp}e$ is obtained from the target coil current $I_{chp}*$ and the actually measured coil current $I_{chp}$.

$$I_{chp}e = I_{chp}* - I_{chp}$$

The difference coil current $I_{chp}e$ is amplified in the current controller K2, and a control signal of a pulse shape is obtained by the pulse width modulator PWM2. By the control signal, the first transistor $Tr_1$ of the power storage circuit $3a$ is turned to be ON/OFF. By doing so, the coil current $I_{chp}$ is controlled to be the target coil current $I_{chp}*$.

In the third control method, the controller 4 does not directly control the AC/DC converter 2. Alternatively, even when the controller controls the AC/DC converter 2, making the voltage of the DC circuit constant is not considered. This is because the voltage of the DC circuit is stabilized by controlling the power storage circuit $3a$. Accordingly, even when the AC/DC converter 2 is configured by the diode rectification circuit, it is possible to implement the third control method.

Figure 7A:
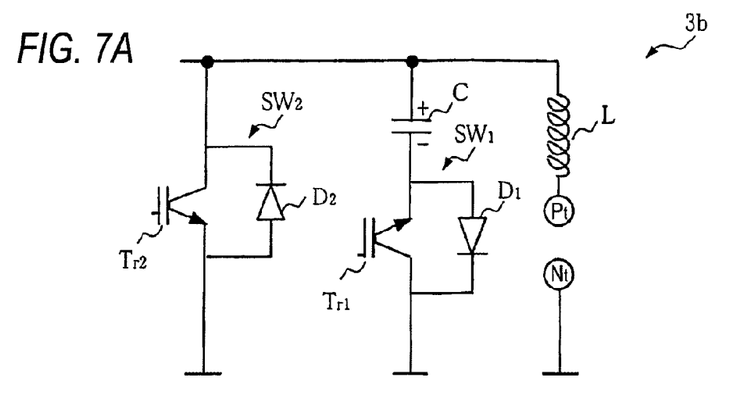
FIGS. 7A to 7C are circuit diagrams of power storage circuits according to second to fourth illustrative embodiments of the invention.
Figure 7B:
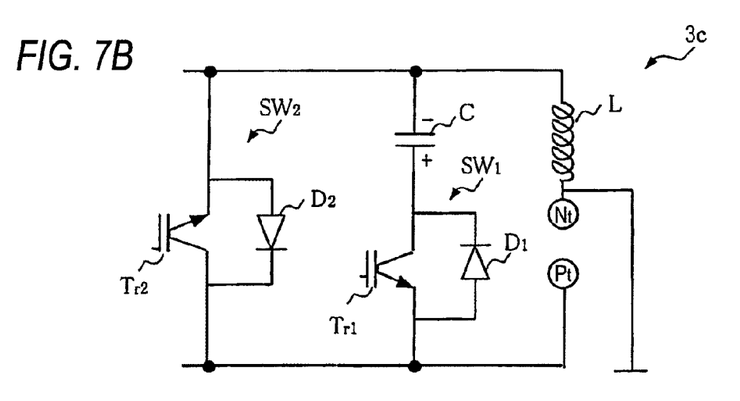
Figure 7C:
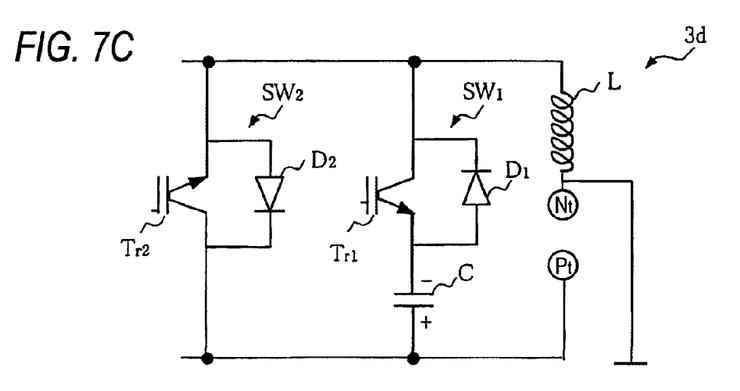

In FIGS. 7A to 7C, the other illustrative embodiments that belong to the power storage circuit 3 having the first configuration are shown. In other words, power storage circuits $3b$, $3c$, $3d$ according to second, third and fourth illustrative embodiments are shown. In these illustrative embodiments, some elements and arrangements of the electrical parts of the power storage circuit $3a$ according to the first illustrative embodiment are partially changed, but the electrical parts are commonly used. Accordingly, the same electrical parts are indicated with the same reference numerals and the descriptions thereof are omitted. The power storage circuit $3b$ of the second illustrative embodiment is a circuit in which the arrangement of the capacitor C and the first switch circuit $SW_1$ of the power storage circuit $3a$ of the first illustrative embodiment is changed. The power storage circuit $3c$ of the third illustrative embodiment is a circuit in which the coil L connected to the positive terminal $P_t$ of the power storage circuit $3a$ of the first illustrative embodiment is connected to the negative terminal $N_t$. The power storage circuit $3d$ of the fourth illustrative embodiment is a circuit in which the arrangement of the capacitor C and the first switch circuit $SW_1$ of the power storage circuit $3c$ of the third illustrative embodiment is changed. Although the descriptions are omitted because one skilled in the art can easily understand, the power storage circuits $3b$, $3c$, $3d$ of the second to fourth illustrative embodiments also have the substantially same operations as the power storage circuits $3a$ of the first illustrative embodiment and can be controlled by the first to third control methods.

Figure 8:
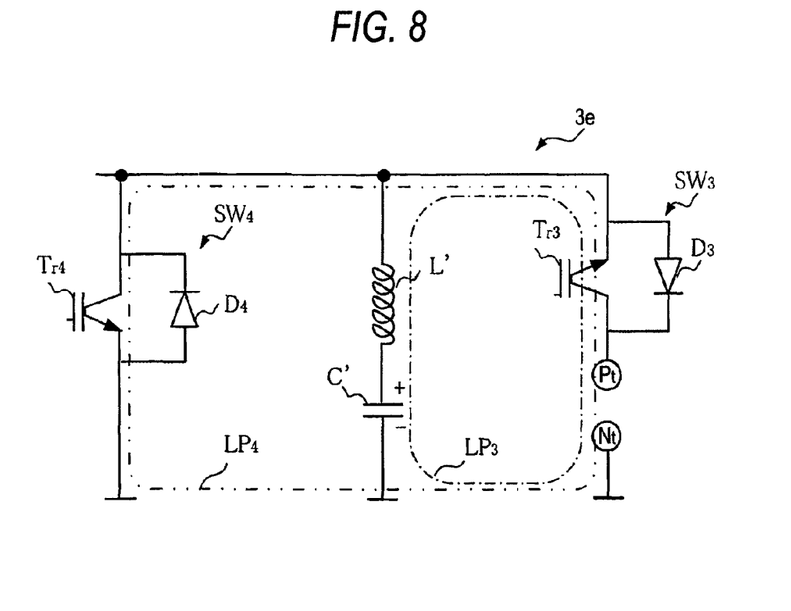
FIG. 8 is a circuit diagram of a power storage apparatus according to a fifth illustrative embodiment of the invention.

In FIG. 8, a power storage circuit $3e$ according to an illustrative embodiment that belongs to the power storage circuit 3 having the second configuration, i.e., a fifth illustrative embodiment is shown. The power storage circuit $3e$ according to the fifth illustrative embodiment is different from the power storage circuits $3a$, $3b$, $3c$, $3d$ according to the first to fourth illustrative embodiments, in that the arrangement of the electrical parts is different. In the power storage circuit $3e$ according to the fifth illustrative embodiment, third and fourth loop circuits $LP_3$, $LP_4$ are provided. The negative terminal $N_t$, the positive terminal $P_t$ and a third switch circuit $SW_3$ are connected in series and are commonly shared by the third and fourth loop circuits $LP_3$, $LP_4$. A coil L' and a capacitor C' are connected in series to the third loop circuit $LP_3$, and a fourth switch circuit $SW_4$ is connected to the fourth loop circuit $LP_4$. Accordingly, in the third loop circuit $LP_3$, the negative terminal $N_t$, the positive terminal $P_t$, the third switch circuit $SW_3$, the coil L' and the capacitor C' are connected in series, and in the fourth loop circuit $LP_4$, the negative terminal $N_t$, the positive terminal $P_t$, the third switch circuit $SW_3$ and the fourth switch circuit $SW_4$ are connected in series. The third switch circuit $SW_3$ is configured by a third diode $D_3$ and a third transistor $Tr_3$. The third diode $D_3$ is connected so as to supply the current in the direction from the negative terminal $N_t$ to the positive terminal $P_t$, and the third transistor $Tr_3$ is connected in parallel with the third diode $D_3$ so that the third transistor supplies the current in the reverse direction when it is turned to be ON. Further, the fourth switch circuit $SW_4$ is configured by a fourth diode $D_4$ and a fourth transistor $Tr_4$. The fourth diode $D_4$ is connected so as to supply the current in the direction from the negative terminal $N_t$ to the positive terminal $P_t$, and the fourth transistor $Tr_4$ is connected in parallel with the fourth diode $D_4$ so that the fourth transistor supplies the current in the reverse direction when it is turned to be ON.

In the power storage circuit $3e$ according to the fifth illustrative embodiment, when the third transistor $Tr_3$ is turned to be ON, the current is supplied from the positive and negative terminals $P_t$, $N_t$ to the coil L' and the capacitor C', so that the magnetic energy is accumulated in the coil L'. When the third transistor $Tr_3$ is turned to be OFF, the current is continuously supplied to the coil L' and the capacitor C' via the fourth diode $D_4$ by the magnetic energy. Therefore, by repeating the ON/OFF operations of the third transistor $Tr_3$, it is possible to effectively accumulate the charges in the capacitor C' and to store the power in the power storage circuit $3e$. In the power storage circuit $3e$ according to the fifth illustrative embodiment, the storage voltage of the capacitor C' does not exceed the voltage between the positive and negative terminals $P_t$, $N_t$. Accordingly, there is a merit in that excessive pressure resistance is not required for the capacitor C'. The stored power can be supplied between the positive and negative terminals $P_t$, $N_t$, i.e., to the DC circuit by turning the fourth transistor $Tr_4$ ON/OFF. In other words, when the fourth transistor $Tr_4$ is turned to be ON, the current is supplied in the direction of the capacitor C', the coil L' and the fourth transistor $Tr_4$, so that the magnetic energy is accumulated in the coil L'. At this time, when the fourth transistor $Tr_4$ is turned to be OFF, since the current flowing through the coil L' intends to continuously flow, the current is supplied to the positive and negative terminals $P_t$, $N_t$ via the third diode $D_3$.

When the third and fourth transistors are turned to be ON/OFF, it is possible to store the power in the power storage circuit $3e$ or to supply the power to the DC circuit. Accordingly, also in the power storage circuit $3e$ according to the fifth illustrative embodiment, it is possible to implement the first to third control methods that have been described in the power storage circuit $3a$ according to the first illustrative embodiment. By doing so, it is possible to control the power storage circuit $3e$ in conjunction with the AC/DC converter 2 or servo amplifier of the injection servo motor, so that it is possible to securely suppress the maximum power when performing the injection process.

What is claimed is:

1. An electromotive injection molding machine comprising a power supplying apparatus that supplies power to servo amplifiers through a DC circuit, the servo amplifiers driving servo motors provided to components of the electromotive injection molding machine, the components including a screw, a mold opening/shutting device and a molded product ejecting device, wherein the power supplying apparatus comprises:
an AC/DC converter, which includes a PWM converter, and which converts a three-phase AC voltage to supply a DC voltage to the DC circuit; and
a first power storage circuit, which is connected to the DC circuit, and which includes at least first and second loop circuits, wherein the first loop circuit is a circuit in which the DC circuit, a coil, a first switch circuit and a capacitor are connected in series between a positive terminal and a negative terminal, wherein the second loop circuit is a circuit in which the coil and a second switch circuit are connected in series between the positive terminal and the negative terminal, wherein the first switch circuit includes a first diode and a first transistor, which are connected in parallel with each other, wherein the first diode is provided to supply current in a direction from the positive terminal to the negative terminal, and wherein the first transistor is provided to supply current in a direction from the negative terminal to the positive terminal when the first transistor is turned to be ON, and wherein the second switch circuit includes a second diode and a second transistor, which are connected in parallel with each other, wherein the second diode is provided to supply current in a direction from the negative terminal to the positive terminal, and wherein the second transistor is provided to supply current in a direction from the positive terminal to the negative terminal when the second transistor is turned to be ON, wherein the electromotive injection molding machine comprises a controller that is configured to:

in a process of a molding cycle except for an injection process, control ON/OFF of the second transistor to store predetermined charges in the capacitor and to store power in the first power storage circuit; and in the injection process, control the AC/DC converter to:

obtain a temporary target current, which is a temporary target value for direct current of the AC/DC converter, from a difference voltage between a target voltage of the DC voltage and an actually measured voltage;

obtain a target current by removing a high frequency component exceeding a frequency having a predetermined threshold from the temporary target current; and control a direct current supplied from the AC/DC converter to become the target current, and wherein in the injection process, when supplying the power stored in the first power storage circuit to the DC circuit by controlling ON/OFF of the first transistor, a target coil current for controlling current flowing through the coil is the high frequency component of the temporary target current.

2. An electromotive injection molding machine comprising a power supplying apparatus that supplies power to servo amplifiers through a DC circuit, the servo amplifiers driving servo motors provided to components of the electromotive injection molding machine, the components including a screw, a mold opening/shutting device and a molded product ejecting device, wherein the power supplying apparatus comprises:

an AC/DC converter, which includes a PWM converter or a diode rectification circuit, and which converts a three-phase AC voltage to supply a DC voltage to the DC circuit; and a first power storage circuit, which is connected to the DC circuit, and which includes at least first and second loop circuits, wherein the first loop circuit is a circuit in which the DC circuit, a coil, a first switch circuit and a capacitor are connected in series between a positive terminal and a negative terminal, wherein the second loop circuit is a circuit in which the coil and a second switch circuit are connected in series between the positive terminal and the negative terminal, wherein the first switch circuit includes a first diode and a first transistor, which are connected in parallel with each other, wherein the first diode is provided to supply current in a direction from the positive terminal to the negative terminal, and wherein the first transistor is provided to supply current in a direction from the negative terminal to the positive terminal when the first transistor is turned to be ON, and wherein the second switch circuit includes a second diode and a second transistor, which are connected in parallel with each other, wherein the second diode is provided to supply current in a direction from the negative terminal to the positive terminal, and wherein the second transistor is provided to supply current in a direction from the positive terminal to the negative terminal when the second transistor is turned to be ON, and wherein the electromotive injection molding machine comprises a controller that is configured to:

in a process of a molding cycle except for an injection process, control ON/OFF of the second transistor to store predetermined charges in the capacitor and to store power in the first power storage circuit; and in the injection process, when supplying the power stored in the first power storage circuit to the DC circuit by controlling ON/OFF of the first transistor, obtain a target coil current for the coil from information of driving power of an injection servo motor that drives the screw in an axial direction so as to control a coil current of the coil based on the target coil current.

3. An electromotive injection molding machine comprising a power supplying apparatus that supplies power to servo amplifiers through a DC circuit, the servo amplifiers driving servo motors provided to components of the electromotive injection molding machine, the components including a screw, a mold opening/shutting device and a molded product ejecting device, wherein the power supplying apparatus comprises:

an AC/DC converter, which includes a PWM converter or diode rectification circuit, and which converts a three-phase AC voltage to supply a DC voltage to the DC circuit; and a first power storage circuit, which is connected to the DC circuit, and which includes at least first and second loop circuits, wherein the first loop circuit is a circuit in which the DC circuit, a coil, a first switch circuit and a capacitor are connected in series between a positive terminal and a negative terminal, wherein the second loop circuit is a circuit in which the coil and a second switch circuit are connected in series between the positive terminal and the negative terminal, wherein the first switch circuit includes a first diode and a first transistor, which are connected in parallel with each other, wherein the first diode is provided to supply current in a direction from the positive terminal to the negative terminal, and wherein the first transistor is provided to supply current in a direction from the negative terminal to the positive terminal when the first transistor is turned to be ON, and wherein the second switch circuit includes a second diode and a second transistor, which are connected in parallel with each other, wherein the second diode is provided to supply current in a direction from the negative terminal to the positive terminal, and wherein the second transistor is provided to supply current in a direction from the positive terminal to the negative terminal when the second transistor is turned to be ON, and wherein the electromotive injection molding machine comprises a controller that is configured to:
in a process of a molding cycle except for an injection process, control ON/OFF of the second transistor to store predetermined charges in the capacitor and to store power in the first power storage circuit; and
in the injection process, when supplying the power stored in the first power storage circuit to the DC circuit by controlling ON/OFF of the first transistor, obtain a temporary target current, which is a temporary target value for current to be supplied from the AC/DC converter, from a difference voltage between a target voltage of the DC voltage and an actually measured voltage, and obtain a target coil current for the coil by adding current calculated on the basis of driving power of an injection servo motor, which drives the screw in an axial direction, to the temporary target current, so as to control a coil current of the coil based on the target coil current.

4. An electromotive injection molding machine comprising a power supplying apparatus that supplies power to servo amplifiers through a DC circuit, the servo amplifiers driving servo motors provided to components of the electromotive injection molding machine, the components including a screw, a mold opening/shutting device and a molded product ejecting device,
wherein the power supplying apparatus comprises:
an AC/DC converter, which includes a PWM converter, and which converts a three-phase AC voltage to supply a DC voltage to the DC circuit; and
a second power storage circuit, which is connected to the DC circuit, and which includes at least third and fourth loop circuits,
wherein the third loop circuit is a circuit in which a capacitor, a coil, a third switch circuit, and the DC circuit are connected in series between a positive terminal and a negative terminal,
wherein the fourth loop circuit is a circuit in which a fourth switch circuit and the third switch circuit are connected in series between the positive terminal and the negative terminal,
wherein the third switch circuit includes a third diode and a third transistor, which are connected in parallel with each other, wherein the third diode is provided to supply current in a direction from the negative terminal to the positive terminal, and wherein the third transistor is provided to supply current in a direction from the positive terminal to the negative terminal when the third transistor is turned to be ON, and
wherein the fourth switch circuit includes a fourth diode and a fourth transistor, which are connected in parallel with each other, wherein the fourth diode is provided to supply current in a direction from the negative terminal to the positive terminal, and wherein the fourth transistor is provided to supply current in a direction from the positive terminal to the negative terminal when the fourth transistor is turned to be ON,
wherein the electromotive injection molding machine comprises a controller that is configured to:
in a process of a molding cycle except for an injection process, control ON/OFF of the third transistor to store predetermined charges in the capacitor and to store power in the second power storage circuit; and
in the injection process, control the AC/DC converter to:
obtain a temporary target current, which is a temporary target value for direct current of the AC/DC converter, from a difference voltage between a target voltage of the DC voltage and an actually measured voltage;
obtain a target current by removing a high frequency component exceeding a frequency having a predetermined threshold from the temporary target current; and
control a direct current supplied from the AC/DC converter to become the target current, and
wherein in the injection process, when supplying the power stored in the second power storage circuit to the DC circuit by controlling ON/OFF of the fourth transistor, a target coil current for controlling current flowing through the coil is the high frequency component of the temporary target current.

5. An electromotive injection molding machine comprising a power supplying apparatus that supplies power to servo amplifiers through a DC circuit, the servo amplifiers driving servo motors provided to components of the electromotive injection molding machine, the components including a screw, a mold opening/shutting device and a molded product ejecting device,
wherein the power supplying apparatus comprises:
an AC/DC converter, which includes a PWM converter or diode rectification circuit, and which converts a three-phase AC voltage to supply a DC voltage to the DC circuit; and
a second power storage circuit, which is connected to the DC circuit, and which includes at least third and fourth loop circuits,
wherein the third loop circuit is a circuit in which a capacitor, a coil, a third switch circuit, and the DC circuit are connected in series between a positive terminal and a negative terminal,
wherein the fourth loop circuit is a circuit in which a fourth switch circuit and the third switch circuit are connected in series between the positive terminal and the negative terminal,
wherein the third switch circuit includes a third diode and a third transistor, which are connected in parallel with each other, wherein the third diode is provided to supply current in a direction from the negative terminal to the positive terminal, and wherein the third transistor is provided to supply current in a direction from the positive terminal to the negative terminal when the third transistor is turned to be ON, and
wherein the fourth switch circuit includes a fourth diode and a fourth transistor, which are connected in parallel with each other, wherein the fourth diode is provided to supply current in a direction from the negative terminal to the positive terminal, and wherein the fourth transistor is provided to supply current in a direction from the positive terminal to the negative terminal when the fourth transistor is turned to be ON, and
wherein the electromotive injection molding machine comprises a controller that is configured to:
in a process of a molding cycle except for an injection process, control ON/OFF of the third transistor to store predetermined charges in the capacitor and to store power in the second power storage circuit; and
in the injection process, when supplying the power stored in the second power storage circuit to the DC circuit by controlling ON/OFF of the fourth transistor, obtain a target coil current for the coil from information of driving power of an injection servo motor that drives the screw in an axial direction so as to control a coil current of the coil based on the target coil current.

6. An electromotive injection molding machine comprising a power supplying apparatus that supplies power to servo amplifiers through a DC circuit, the servo amplifiers driving servo motors provided to components of the electromotive injection molding machine, the components including a screw, a mold opening/shutting device and a molded product ejecting device, wherein the power supplying apparatus comprises:

an AC/DC converter, which includes a PWM converter or diode rectification circuit, and which converts a three-phase AC voltage to supply a DC voltage to the DC circuit; and a second power storage circuit, which is connected to the DC circuit, and which includes at least third and fourth loop circuits, wherein the third loop circuit is a circuit in which a capacitor, a coil, a third switch circuit, and the DC circuit are connected in series between a positive terminal and a negative terminal, wherein the fourth loop circuit is a circuit in which a fourth switch circuit and the third switch circuit are connected in series between the positive terminal and the negative terminal, wherein the third switch circuit includes a third diode and a third transistor, which are connected in parallel with each other, wherein the third diode is provided to supply current in a direction from the negative terminal to the positive terminal, and wherein the third transistor is provided to supply current in a direction from the positive terminal to the negative terminal when the third transistor is turned to be ON, and wherein the fourth switch circuit includes a fourth diode and a fourth transistor, which are connected in parallel with each other, wherein the fourth diode is provided to supply current in a direction from the negative terminal to the positive terminal, and wherein the fourth transistor is provided to supply current in a direction from the positive terminal to the negative terminal when the fourth transistor is turned to be ON, and wherein the electromotive injection molding machine comprises a controller that is configured to:

in a process of a molding cycle except for an injection process, control ON/OFF of the third transistor to store predetermined charges in the capacitor and to store power in the second power storage circuit; and in the injection process, when supplying the power stored in the second power storage circuit to the DC circuit by controlling ON/OFF of the fourth transistor, obtain a temporary target current, which is a temporary target value for current to be supplied from the AC/DC converter, from a difference voltage between a target voltage of the DC voltage and an actually measured voltage, and obtain a target coil current for the coil by adding current calculated on the basis of driving power of an injection servo motor, which drives the screw in an axial direction, to the temporary target current, so as to control a coil current of the coil based on the target coil current.

* * * * *